INVENTOR.
ROBERT R. ROALEF
BY Wade Koontz
ATTORNEY.
and
James S. Shannon
AGENT

CURRENT LIMITING DEVICE

Original Filed May 15, 1958 5 Sheets-Sheet 2

INVENTOR.
ROBERT R. ROALEF
BY Wade Koontz
ATTORNEY
and
James S. Shannon
AGENT

Feb. 25, 1964 R. R. ROALEF 3,122,654

CURRENT LIMITING DEVICE

Original Filed May 15, 1958 5 Sheets-Sheet 3

INVENTOR.
ROBERT R. ROALEF
BY Wade Koontz
ATTORNEY
James S. Shannon
AGENT

CURRENT LIMITING DEVICE

Original Filed May 15, 1958 5 Sheets-Sheet 4

INVENTOR.
ROBERT R. ROALEF
BY Wade Koontz
ATTORNEY
and
James S. Shannon
AGENT

CURRENT LIMITING DEVICE

Original Filed May 15, 1958 5 Sheets-Sheet 5

INVENTOR.
ROBERT R. ROALEF
BY Wade Koontz
ATTORNEY
and
James S. Shannon
AGENT

United States Patent Office 3,122,654
Patented Feb. 25, 1964

3,122,654

CURRENT LIMITING DEVICE

Robert R. Roalef, 321 Kenilworth Ave., Dayton, Ohio

Original application May 15, 1958, Ser. No. 735,651, now Patent No. 3,027,466, dated Mar. 27, 1962. Divided and this application Nov. 28, 1961, Ser. No. 155,512
3 Claims. (Cl. 307—88.5)
(Granted under Title 35, U.S. Code (1952), sec. 266)

The invention described herein may be manufactured and used by or for the United States Goverment for governmental purposes without the payment to me of any royalty thereon.

This application is a division of my application Serial No. 735,651, filed May 15, 1958, now Patent No. 3,027,-466.

This invention relates to current limiting devices and is primarily concerned with the protection of delicate current sensing apparatus, such as sensitive null meters or the sensitive error signal sensing amplifiers used in servo systems, against overloads and consequent burn out.

The ideal protective device would offer no resistance, or very little resistance, to current flow to the protected apparatus at low applied voltages, so as to preserve the sensitivity of the apparatus to weak signals, and would act automatically at higher applied voltages to limit the current to the protected apparatus to a safe value. The current limiting devices described herein utilize the peculiar properties of semiconductor diodes to approach this ideal.

A more detailed description of the invention will be given with reference to the specific embodiments thereof shown in the accompanying drawing in which FIG. 1 illustrates the characteristic of a diode having low incremental impedance at zero voltage, such as a germanium diode, FIG. 2 is a current limiter employing diodes having characteristics as shown in FIG. 1, FIG. 3 shows the characteristic of the limiter of FIG. 2, FIG. 4 shows a limiter employing series diodes of the type illustrated in FIG. 1 and shunt diodes of the type illustrated in FIG. 5, FIG. 5 illustrates the characteristic of a diode having high incremental impedance at zero voltage, such as a silicon diode.

Figure 10:
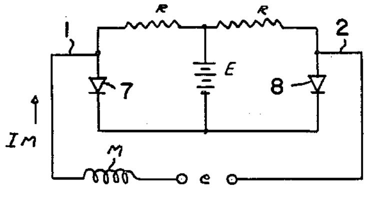
FIG. 10 is a limiter circuit employing the principles of FIGS. 7, 8 and 9.
Figure 12A:
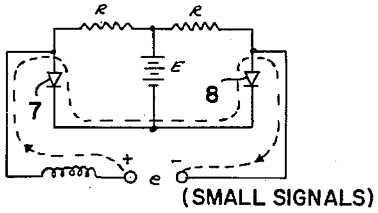
Figure 12B:
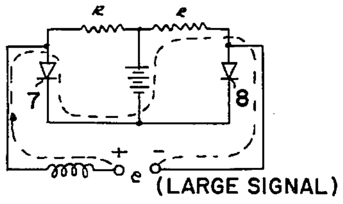
Figure 13:
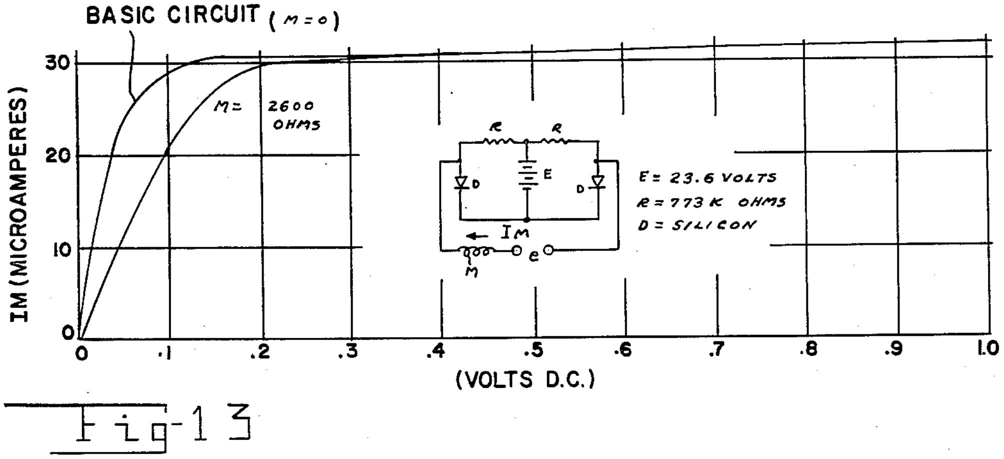
Figure 14:
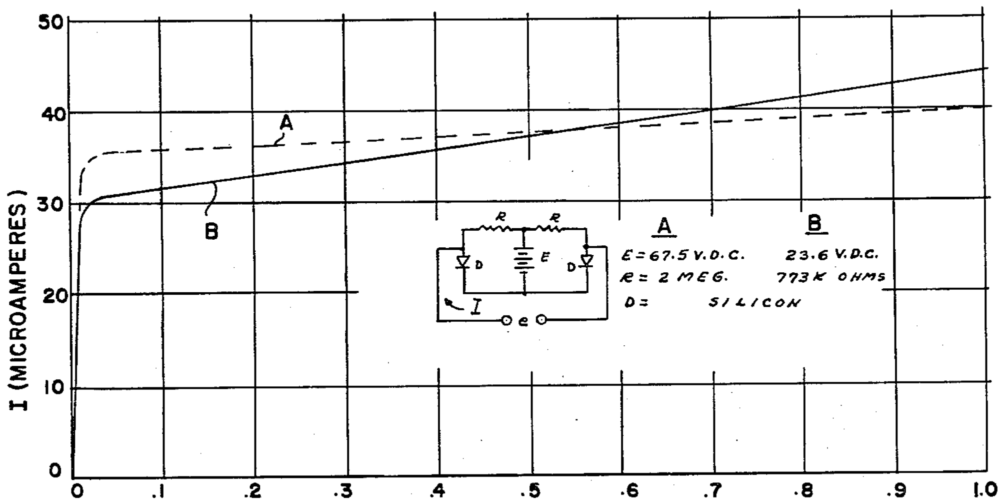
Figure 15:
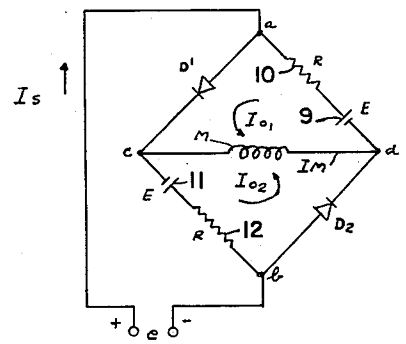
Figure 16:
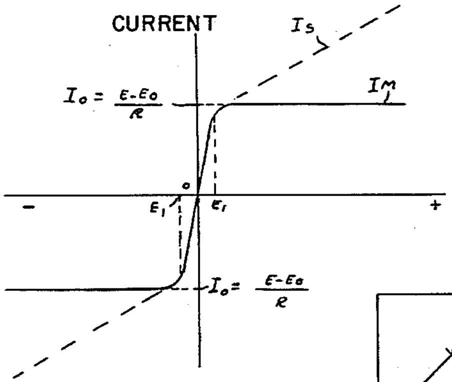
Figure 17:
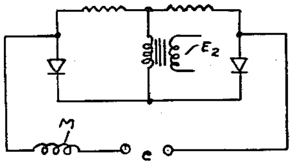
Figure 18:
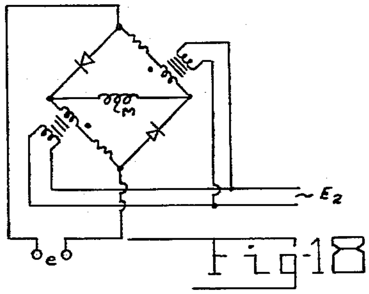
Figure 19:
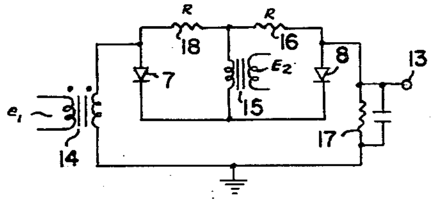
Figure 20:
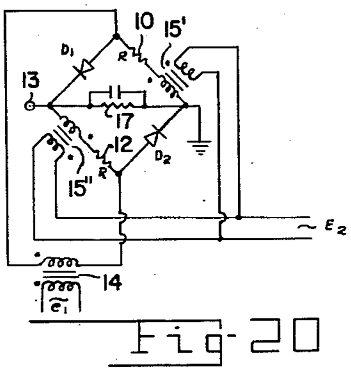
Figure 21:
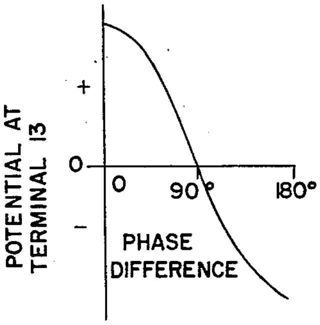

FIGS. 12*a* and 12*b* illustrate the operation of FIG. 10,

FIGS. 13 and 14 are measured characteristics of limiters of the type shown in FIG. 10, FIG. 15 illustrates a current limiter requiring a smaller biasing voltage than the limiter of FIG. 10, FIG. 16 is the characteristic of the limiter in FIG. 15, FIGS. 17 and 18 illustrate alternating current biasing in circuits of the type shown in FIGS. 10 and 15, FIGS. 19 and 20 illustrate limiters of the type shown in FIGS. 10 and 15 used as phase detectors, FIG. 21 illustrates the phase characteristic of the circuits of FIGS. 19 and 20.

Figure 1:
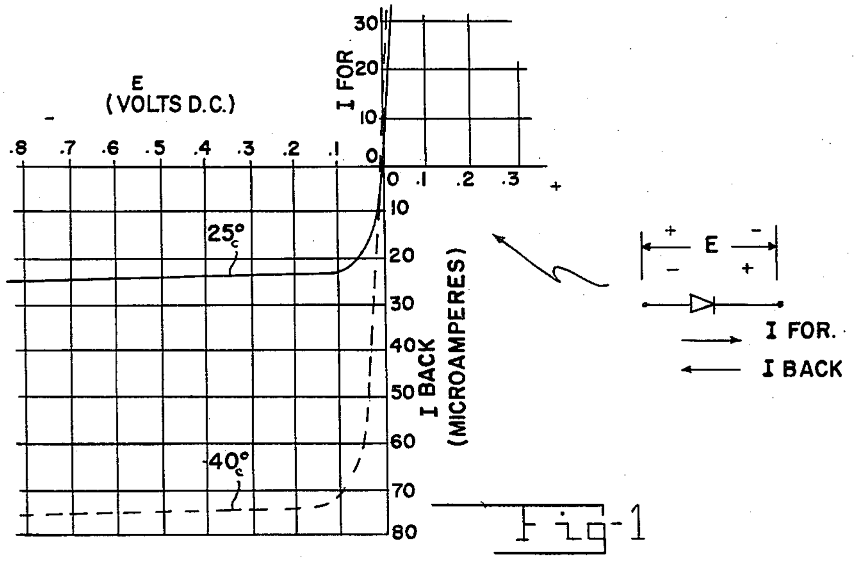

FIG. 1 shows the E-I characteristic of a typical junction type germanium diode such as the General Electric IN93. For current flow in the back direction, the impedance of the diode at 25° C. is seen to be relatively low in the vicinity of zero current, as indicated by the steepness of the characteristic, and to increase abruptly to a relatively high value at about .1 volt and 23 microamperes. At 40° C. this change in impedance occurs at between .1 and .2 volt and 70–80 microamperes. The points are representative and can be expected to vary somewhat from sample to sample.

Figure 2:
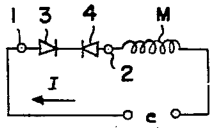
Figure 3:
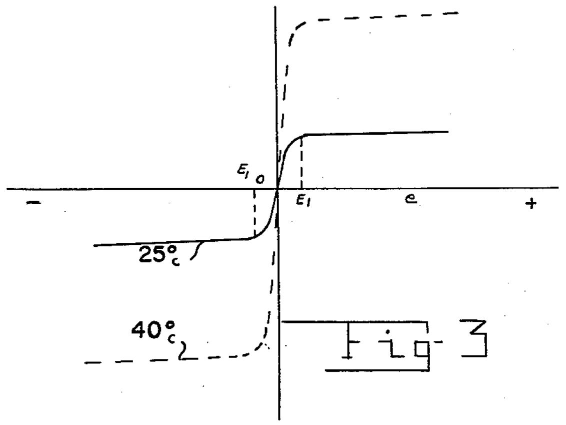

Two diodes having characteristics of the type shown in FIG. 1 may be connected in oppositely poled series relationship to form a simple current limiting device, as shown in FIG. 2. Here a current limiter having terminals 1 and 2 and consisting of oppositely poled germanium diodes 3 and 4 is connected in series with coil M, which, for example, may be the coil of a null meter or the input coil of a magnetic amplifier, and serves to protect the coil against excessive current flow in either direction. The characteristic of the circuit of FIG. 2 is as shown in FIG. 3. For current flow in the direction shown, diode 3 offers a constant relatively low impedance for all values of $e$. Diode 4 offers a similar relatively low impedance for values of $e$ below the value, varying with temperature, that brings the diode voltage to the point of inflection on the diode characteristic. When the current flow is in the opposite direction the roles of diodes 3 and 4 are reversed. For small values of $e$, therefore, the combined impedance of diodes 3 and 4 is relatively low and is less than the impedance of coil M, so that the sensitivity of the protected apparatus to small voltages is not greatly reduced by the current limiting device. For higher values of $e$, above that at which inflection occurs, the greatly increased impedance of diode 3 or 4 prevents any appreciable further increase in current through the coil M. This type of protective device is simple and can be installed within the case of a meter, thereby permitting a sensitive meter to be used in circuits where overloading is likely to occur without the danger of meter burn out.

Figure 4:
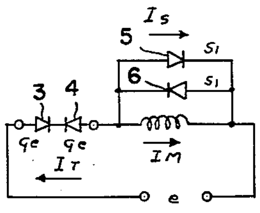
Figures 5, 6:
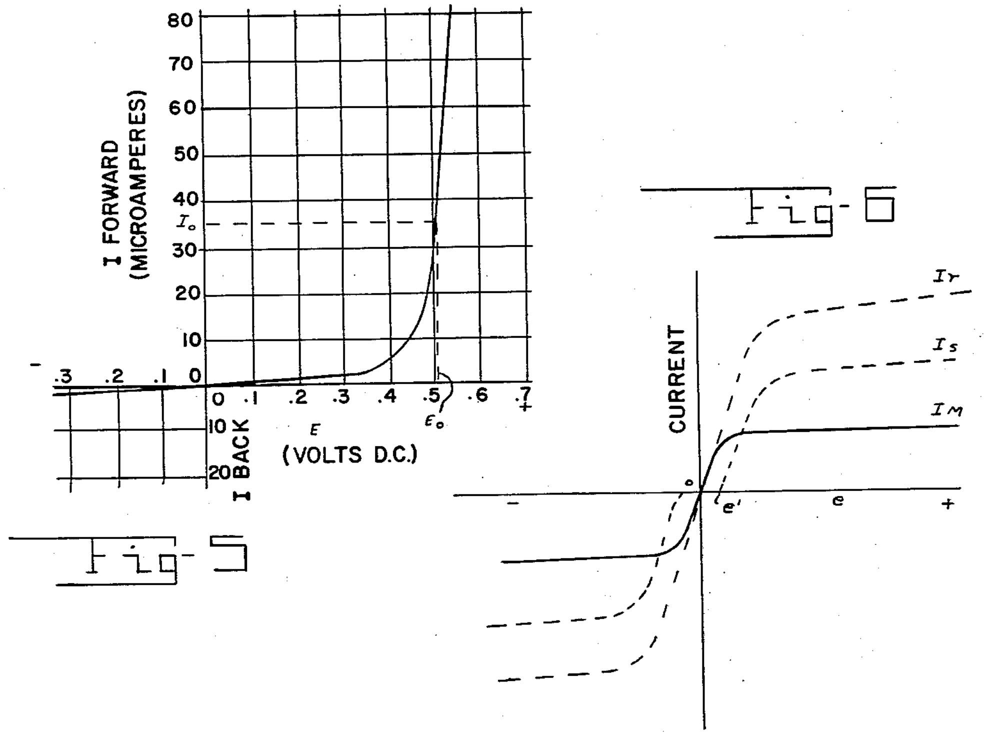
FIG. 6 illustrates the characteristic of FIG. 4.

As indicated, the protection afforded by the above described device is not independent of temperature, which may possibly result in inadequate protection being provided at higher temperatures. The arrangement of FIG. 4 is intended to alleviate this difficulty through the use of a pair of oppositely poled silicon diodes 5 and 6 in shunt to coil M. The E-I characteristic of a typical point contact silicon diode, such as the Hughes No. 6002, is shown in FIG. 5 and is substantially independent of temperature. It is seen that the diode has a very high impedance, substantially an open circuit, in the back direction and also a high impedance in the forward direction up to a voltage between .3 and .5 volt where there is a sharp inflection of the curve representing an abrupt drop in impedance to a relatively low value. In the arrangement of FIG. 4, therefore, $I_M$, as seen in FIG. 6, increases as $e$ increases up to a value $e'$ at which the voltage across the coil M and the silicon diodes is somewhere between .4 and .5 volt and the impedance of the forward connected diode starts changing to its lower value. At this point the diode begins to conduct so that the total current $I_T$ divides between coil M and the shunting diode. The effect of this is to limit further increases in voltage across the coil and in $I_M$, as shown in FIG. 6. Since the silicon diode characteristics are substantially unaffected by temperature changes, the shunting diodes protect the coil against the increased current permitted by the germanium diodes at the higher temperatures.

Because of the fact that silicon diodes require a forward voltage of about .5 volt to produce an abrupt fall in impedance, as shown in FIG. 5, these diodes are not suitable for use in a simple limiting circuit of the type shown in FIG. 2. However, by the use of a direct biasing voltage in circuit with a pair of silicon diodes, it is possible to construct a limiting circuit having a characteristic similar to the circuit of FIG. 2 and providing the advantage that, as a result of using silicon diodes, the limiter characteristic is substantially independent of temperature. FIGS. 7–12 illustrate the principles underlying the design of this circuit.

Figure 7:
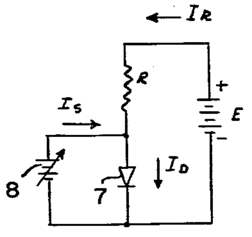
FIGS. 7, 8 and 9 illustrate the principles involved in a current limiter having an adjustable threshold and using diodes of either the type shown in FIG. 1 or in FIG. 5.
Figure 8:
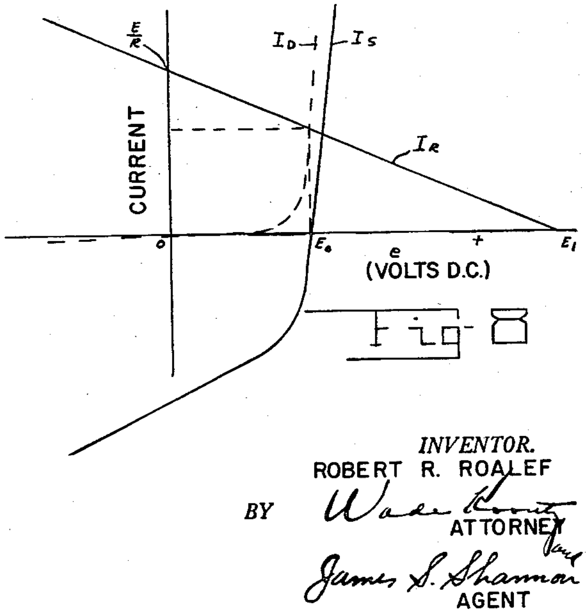

Referring to FIG. 7, silicon diode 7 is connected in series with a source of direct voltage E and a resistance R. A source 8 of low internal impedance relative to R and providing a variable direct voltage $e$ is connected across the diode. It is apparent that $I_S=I_D-I_R$. FIG. 8 shows the manner in which $I_D$, $I_R$ and their algebraic difference $I_S$ vary with $e$. As $e$ decreases from a value above $E_0$, which is the voltage that would exist across the diode if source 8 were removed, $I_R$ increases and $I_D$ decreases, becoming equal and reducing $I_S$ to zero at $e=E_0$. At this point $I_R=I_D=I_0$ which is referred to as the quiescent current. As $e$ decreases below $E_0$, $I_S$ reverses its direction and flows into source 8. This current begins to limit as $e$ enters the region of flexure of the $I_D$ curve. Below this region the diode has a very high impedance, as indicated by the flatness of the $I_D$ curve, and the value of $I_S$ is determined principally by R which, as stated above, is assumed to be much greater than the internal impedance of source 8. In FIG. 8 the internal impedance of source 8 is assumed to be substantially zero so that $$I_S=\frac{E-e}{R}$$

for values of $e$ below the flexure region. The resistance presented by the circuit to source 8 at $e=E_0$ is very low as indicated by the steepness of the $e$-$I_S$ characteristic at this point. By increasing R to a relatively high value and then increasing $E_1$ as required to reestablish the same value of $I_0$, the limiting action of the circuit for current flow into source 8 can be improved, as indicated in FIG. 9 where that part of the $I_S$ curve below the flexure region is much flatter than in FIG. 8.

Figure 9:
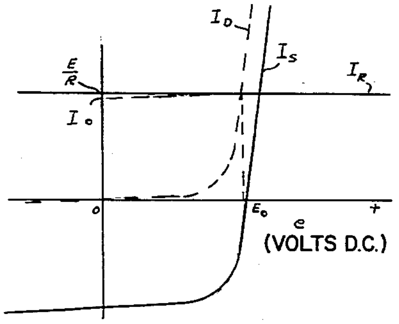
Figure 11:
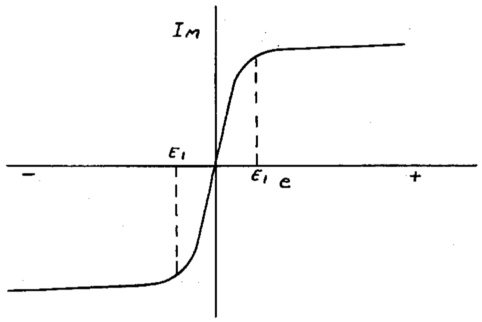
FIG. 11 is the overall characteristic of the limiter in FIG. 10.

It will be seen that the shape of the $e$-$I_S$ characteristic of FIG. 9 is very similar to that of the E-I characteristic of silicon shown in FIG. 5. Also, if the point $E_0$ is considered the origin, the characteristic is very similar to that of germanium shown in FIG. 1. By using a second diode 8 and duplicating the circuit of FIG. 7, as shown in FIG. 10, $E_0$ can effectively be made the origin with respect to an applied voltage $e$ of either polarity. Therefore, the circuit between terminals 1 and 2 acts as a current limiting device for coil M and, as shown in FIG. 11, has a characteristic which is similar to the characteristic of the circuit of FIG. 2. Figs. 12*a* and 12*b* illustrate the operation of the circuit of FIG. 10. For small values of $e$, of the polarity shown, the current $I_M$ travels through diode 7 in the forward direction and through diode 8 in the backward direction, the impedance of the diodes being very low relative to R for voltages in the vicinity of $E_0$ as indicated in FIG. 9 by the steepness of the characteristic at this point. For values of $e$ causing the voltage across diode 8, as measured from $E_0$ in FIG. 9, to go beyond the flexure region of its characteristic, the diode presents substantially an open circuit to the current so that it must flow through the battery and R, as shown in FIG. 12*b*, and is limited to the value permitted by the magnitude of this resistance. Due to the symmetry of the circuit, reversing the polarity of $e$ merely interchanges the roles of diodes 7 and 8.

As may be seen by a comparison of FIGS. 8 and 9, the effectiveness of the circuit of FIG. 10 as a current limiter increases as R increases. For effective limiting, as indicated by a low value of slope for that part of the $e$-$I_S$ curve corresponding to values of $e$ below the flexure region, a relatively large R is required. FIGS. 13 and 14 show the measured characteristics of the circuit of FIG. 10 for two values of R with the values of E required to produce limiting in the 30–35 microampere region. FIG. 13 shows the effect of the coil M or load resistance on one of the characteristics for low values of $e$. It is apparent that limiting takes place when the current reaches a value equal to the quiescent current $I_0$ which is directly related to $E/R$ and, for large values of R, is substantially equal to $E/R$, as seen in FIGS. 8 and 9. Therefore, for any given value of R, the limiting point can be controlled by changing E. For quiescent currents in the microampere range, as would occur when protecting a very sensitive meter element, it is feasible to use small batteries to supply the voltage E since at this low current drain the battery life can be expected to approximate shelf life. The voltage E can of course be obtained from a conventional D.C. power supply instead of a battery where complete portability is not required.

As seen from FIGS. 13 and 14, for effective limiting at currents of 30 microamperes or greater, relatively high values of E are required, which may be undesirable where batteries are used to supply the potential. The circuit of FIG. 15 provides absolute limitation of the current through coil M over a wide range without requiring high direct biasing voltages. Considering this circuit further and assuming $e=0$, battery 9 causes a circulating current $I_{01}$ to flow in the loop circuit consisting of battery 9, resistor 10, diode $D_1$ and coil M. Similarly, battery 11 causes a circulating current $I_{02}$ to flow in the loop circuit consisting of battery 11, resistor 12, diode $D_2$ and coil M. If the sources 9 and 11 provide equal voltages E, if resistors 10 and 12 have equal values R and if the diodes $D_1$ and $D_2$ are matched, then $I_{01}=I_{02}$ and, since the two currents flow in opposite directions through coil M, the current $I_M$ is zero. Diodes $D_1$ and $D_2$ may be of germanium or silicon, but are preferably the latter in order to take advantage of the relative independence of temperature exhibited by the silicon diode characteristic.

The voltages E bias diodes $D_1$ and $D_2$ in their conductive regions at a voltage at which the incremental impedance is low. This biasing voltage across the diode terminals may be designated $E_0$ and may have, for silicon, a value of .51 volt, for example, giving a diode current of about 35 microamperes as seen in FIG. 5. The value of R is determined by the relationship $$R=\frac{E-E_0}{I_0}$$

and for the above specific case, using a small low voltage battery such, for example, as the Mallory PR-1 mercury cell having a potential of 2.6 volts, $$R=\frac{2.6-.51}{35\times10^{-6}}=59{,}700 \text{ ohms}$$

As $e$ increases above zero, assuming the polarity shown, the resulting source current $I_S$ flows through $D_1$, M and $D_2$ in succession. The current takes this path because the incremental impedance of $D_1$ and $D_2$ at $E_0$ (FIG. 5) is much less than R and therefore substantially none of $I_S$ flows through resistors 10 and 12. The current $I_S$ flows through $D_2$ in opposition to $I_{02}$ and therefore reduces the total forward current flow through this diode and the voltage across it. For values of $e$ from zero up to a certain value $E_1$ the voltage across $D_2$ is such that its incremental impedance is low. For the diode of FIG. 5, $E_1$ would be that value of $e$ for which the voltage across the diode is reduced to about .48 volt. Over this range of $e$, $I_M=I_S$. As $e$ increases above $E_1$ the incremental impedance of $D_2$ begins to increase, as indicated by the decreasing slope of the characteristic in FIG. 5, and increases rapidly until the potential across the diode is reduced to about .3 volt at which point $D_2$ represents substantially an open circuit. As the impedance of $D_2$ increases an increasing portion of the increment in $I_S$ flows through resistor 12 until eventually any significant further increase in the current through $D_2$, and therefore through M, is impossible. Since the current through $D_2$ equals $I_{02}-I_M$, when this current becomes zero $I_M=I_{02}$ so that the current in coil M positively limits at a value equal to the quiescent current. As $e$ increases still further $I_M$ remains constant at the quiescent value while $I_S$ continues to increase at a rate determined by R. This is illustrated in FIG. 16. Due to the symmetry of the circuit, reversing the polarity of $e$ simply interchanges the roles of $D_1$ and $D_2$ and reverses the direction of $I_M$.

As stated above, the current at which the circuit of

FIG. 15 limits is equal to the quiescent current $I_0$. Since this current is determined by E and R in accordance with the relation $$I_0=\frac{E-E_0}{R}$$

the limiting value can be varied by appropriate changes in E or R. For limiting in the range of 30–80 microamperes with a low value of E, the values of R are relatively low and the circuit, when in the limiting state, does not present as high an impedance to the source of $e$ as is presented by the circuit of FIG. 10. However, by increasing E and R in proportion any desired circuit impedance may be obtained for any given limiting current. $E_0$ is nearly a constant quantity as may be seen in FIG. 5 where over a current range of 10–80 microamperes it varies less than .1 volt. As in FIG. 10, the small current drain permits the life of the batteries supplying E to approximate their shelf life. E can, of course, be obtained from a conventional D.C. power supply if desired.

It is not necessary that the circuits of FIGS. 10 and 15 be biased with direct current. Alternating biasing voltages may be used as shown in FIGS. 17 and 18. In FIG. 18, the phasing of the transformer secondary windings must be as indicated and the secondary voltages must be equal. The operation is similar to the direct current biased condition except that a pulsing rather than a continuous direct current passes through coil M.

The signal $e$ in the above case may be alternating as well as direct provided it has the same frequency as $E_2$ and provided there is a fixed phase difference, preferably 0° or 180°, between $e$ and $E_2$. The smallest alternating voltages may be measured since the diodes are forced into conduction by the biasing voltage once in each cycle and while conductive the smallest departure of $e$ from zero can cause a current flow through M. It is, therefore, not necessary for the signal being measured to provide the initial voltage required to cause diode conduction. It is evident that changing the phase relation between $e$ and $E_2$ by 180° reverses the direction of current flow through M. The circuit may therefore be used as a phase sensitive rectifier in servo systems in which the error signal is an alternating voltage having one of two opposite phases depending upon the direction of the error. In this application, $e$ would represent the error signal and $E_2$ would supply the reference phase. A reversal in phase of $e$, indicating a change in the direction or sign of the error, results in a change in direction of the direct current in coil M which may be the input to a sensitive servo control system. In this case also, the limiting action of the circuit protects coil M against high values of the error signal $e$. Where the above 0°–180° relationship between the two applied alternating voltages is not maintained, the output magnitude is not indicative of error signal magnitude; however, the output polarity is still indicative of phase relation, in this case indicating the direction of departure of one voltage from a quadrature relation to the other.

The circuits of FIGS. 17 and 18 also may be used to give a direct current indication of the phase relation between two alternating voltages of the same frequency which is substantially independent of the relative magnitudes of the two alternating voltages. FIGS. 19 and 20 illustrate such use of the circuits of FIGS. 17 and 18, respectively. Referring to FIG. 19, this circuit compares the phase of $e_1$ with that of $E_2$, which may be considered the reference phase, and produces a positive potential at terminal 13 when the phase difference is in the range 0°–90° and a negative potential when in the range 90°–180°, the potential being zero at 90°. The characteristic is illustrated in FIG. 21. $E_2$ corresponds to the biasing voltage E of FIG. 10 and is selected in accordance with the maximum voltage desired at terminal 13. The signal $e_1$ must have sufficient magnitude in this case to drive the circuit into its limiting range. In other words, $e_1$ must exceed the magnitude required at phase angles 0° or 180° to reduce the potential across the diode where it opposes the biasing potential sufficiently to drive that diode into its high impedance range. If the diodes are biased at about the point indicated in FIG. 5 the required minimum potential reduction would be about .1 volt or slightly more.

The operating principle of the circuit of FIG. 19 is no different from that of the circuit of FIG. 10. If the phase difference between $e_1$ and $E_2$ is 0° these two voltages have the same phase at diode 7 and opposite phases at diode 8. Therefore, on the positive half-cycles of $E_2$, diode 7 has a low impedance and diode 8 a very high impedance so that current flows from the secondary of transformer 14 through diode 7, the secondary of transformer 15, resistor 16 and resistor 17 causing terminal 13 to be positive relative to ground. If the phase difference is 180° the two voltages are in phase on diode 8 and of opposite phase on diode 7. Consequently, the previous conditions are reversed with current flowing from the secondary of transformer 14 upward through resistor 17 and thence though diode 8, the secondary of transformer 15 and resistor 18, causing terminal 13 to be negative. When the phase difference is 90°, equal currents flow in opposite directions through resistor 17 during each positive half-cycle of $E_2$ so that the net current and the voltage at terminal 13 are zero. As in FIG. 10, the limiting action of the circuit, resulting from the high value of R, makes the voltage at terminal 13 substantially independent of the magnitude of $e_1$.

When operated under the conditions specified above for FIG. 19, the circuit of FIG. 20 operates to produce the same result, the basic operating principle being the same as for FIG. 15. When $e_1$ and $E_2$ have a phase difference of zero, the two voltages at $D_1$ due to $e_1$ and $E_2$ have the same phase whereas the two voltages at $D_2$ have opposite phases. $D_2$ therefore has a very high impedance, provided $e_1$ exceeds the minimum value specified above as required, and the current from transformer 14 flows through $D_1$ and then divides, part flowing through resistor 17 and $D_2$ to the extent required to cancel the opposite flow through $D_2$ due to transformer 15'', and the remainder flowing through the secondary of transformer 15'' and resistor 12. Terminal 13 is therefore positive. If the phase difference is 180°, conditions are exactly reversed so that current flows upward through resistor 17 toward terminal 13 with the result that this terminal is negative. When the phase difference is 90°, equal currents flow in opposite directions through resistor 17 during each positive half-cycle of $E_2$ with the result that the net current and the voltage of terminal 13 are zero. Since the current through resistor 17 can never exceed the quiescent current through $D_1$ or $D_2$ resulting from the biasing voltages from transformers 15' and 15'', the potential at terminal 13 is independent of the magnitude of $e_1$ in the range above the specified minimum. The maximum voltages at terminal 13 can be adjusted by changing R or the equal secondary voltages of transformers 15' and 15''.

I claim:

1. A phase sensitive rectifier for small error signals comprising: a pair of input terminals "$a$" and "$b$" for receiving said alternating error signal, a pair of output terminals "$c$" and "$d$," a semiconductor diode connected between terminals "$a$" and "$c$," a semiconductor diode connected between terminals "$b$" and "$d$," said diodes having like poles connected to said output terminals, a source of alternating reference voltage and an impedance connected in series between terminals "$a$" and "$d$" and a like source of alternating reference voltage and a like impedance connected between "$b$" and "$c$," said reference voltage sources being poled and phased to send in-phase alternating currents through said diodes in the forward direction, said error signal being of the same frequency as said reference voltages.

2. Apparatus as claimed in claim 1 in which said error signal has one of the two phase angles 0° and 180° relative to said reference voltages.

3. Apparatus for producing a direct current output the magnitude of which is related to the deviation of the phase of a first alternating voltage from a quadrature relation to the phase of a second alternating voltage of the same frequency and the polarity of which is indicative of the direction of the deviation, said apparatus comprising: a pair of input terminals "*a*" and "*b*" for receiving said first alternating voltage, a pair of output terminals "*c*" and "*d*," a semiconductor diode connected between terminals "*a*" and "*c*," a semiconductor diode connected between terminals "*b*" and "*d*," said diodes having like poles connected to said output terminals, means for dividing said second alternating voltage into equal components, means for connecting one component in series with an impedance between terminals "*a*" and "*d*" and the other component in series with a like impedance between terminals "*b*" and "*c*," said components being poled and phased to send in-phase currents in the forward direction through said diodes, the magnitude of said first voltage exceeding that required, when the phase angle between said first and second voltages has one of the voltages 0° and 180°, to reduce the voltage across one of said diodes to the point where its impedance is high relative to the aforementioned impedances.

References Cited in the file of this patent

UNITED STATES PATENTS 2,618,753 Van Mierlo ------------ Nov. 18, 1952